United States Patent
Iritani et al.

(10) Patent No.: US 7,637,117 B2
(45) Date of Patent: Dec. 29, 2009

(54) AIR-CONDITIONING SYSTEM

(75) Inventors: Kunio Iritani, Anjo (JP); Yusuke Shindo, Owariasahi (JP); Kenji Iriyama, Ogaki (JP); Akihito Higashihara, Chiryu (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 12/157,976

(22) Filed: Jun. 13, 2008

(65) Prior Publication Data

US 2008/0250802 A1 Oct. 16, 2008

Related U.S. Application Data

(63) Continuation of application No. 11/063,385, filed on Feb. 23, 2005, now Pat. No. 7,434,416.

(30) Foreign Application Priority Data

Feb. 25, 2004 (JP) ............................. 2004-050257

(51) Int. Cl.
*F25B 49/00* (2006.01)
*F25D 23/12* (2006.01)
(52) U.S. Cl. ..................... 62/230; 62/181; 62/259.2; 62/505
(58) Field of Classification Search .................. 62/179, 62/180, 181, 183, 228.1, 228.4, 230, 259.2, 62/505
See application file for complete search history.

(56) References Cited

U.S. PATENT DOCUMENTS

| 4,320,628 | A | 3/1982 | Okajima |
| 6,523,361 | B2 | 2/2003 | Higashiyama |
| 6,688,122 | B2 * | 2/2004 | Matsuoka ..................... 62/134 |
| 2002/0108384 | A1 | 8/2002 | Higashiyama |
| 2003/0230101 | A1 | 12/2003 | Iritani et al. |
| 2004/0020227 | A1 | 2/2004 | Takemoto et al. |

FOREIGN PATENT DOCUMENTS

| JP | 2003-136944 | 5/2003 |
| JP | 2003-139069 | 5/2003 |

OTHER PUBLICATIONS

Office action dated Nov. 4, 2008 in Japanese Application No. 2004-050257.
Office Action dated May 26, 2006 in corresponding Chinese Application No. 2005-10008388.0 with English translation.

* cited by examiner

*Primary Examiner*—Marc E Norman
(74) *Attorney, Agent, or Firm*—Harness, Dickey & Pierce, PLC

(57) ABSTRACT

An air-conditioning system includes a refrigeration cycle and a control unit. The refrigeration cycle includes an electric compressor in which a compression mechanism for drawing a refrigerant therein for compression is integrated with an electric motor for driving the compression mechanism, and a motor drive circuit for driving the motor is cooled using an intake refrigerant drawn into the compression mechanism. The control unit provides operational control to the motor drive circuit and the refrigeration cycle. When the temperature of the motor drive circuit has exceeded a predetermined temperature, the control unit varies a condition of supplying air to exchange heat with the refrigerant flowing through the refrigeration cycle to thereby reduce the temperature of the intake refrigerant.

26 Claims, 3 Drawing Sheets

INVERTER TEMPERATURE Ti

AIR-CONDITIONING SYSTEM

CROSS-REFERENCE TO RELATED APPLICATIONS

This application is a continuation of U.S. patent application No. 11/063,385 filed on Feb. 23, 2005. This application claims the benefit of JP 2004-050257, filed Feb. 25, 2004. The disclosures of the above applications are incorporated herein by reference.

FIELD

The present disclosure generally relates to an air-conditioning system and, more particularly, an air-conditioning system employing an electric compressor driven by a motor to compress a refrigerant that protects a circuit for driving the motor.

BACKGROUND

Japanese Patent Laid-Open Publication No. 2003-139069 discloses a conventional air-conditioning system including a refrigeration cycle, which employs an electric compressor to compress a refrigerant. This electric compressor is provided in a housing body with a compression portion, a motor for driving the compression portion, and a motor drive circuit for driving the motor. In the motor drive circuit, circuit components (heat generative components) are positioned where the components can exchange heat with an intake refrigerant entering the compression portion.

When the circuit components reach a predetermined temperature or a higher temperature, the rotational speed of the motor is increased to a predetermined rotational speed to thereby increase the flow of the intake refrigerant. The refrigerant cools the circuit components, allowing the cooling operation to be maintained without stopping the motor.

However, the increase in rotational speed of the motor may cause the circuit components to generate heat by themselves, resulting in insufficient cooling even during the increased flow rate of the intake refrigerant. This leads to another predetermined temperature, which is higher than the aforementioned predetermined temperature. In this case, the motor is to be stopped and eventually the cooling operation has to be stopped.

SUMMARY OF THE INVENTION

According to one aspect of the present invention, an air-conditioning system includes a refrigeration cycle and a control unit. The refrigeration cycle includes an electric compressor in which a compression mechanism for drawing a refrigerant therein for compression is integrated with an electric motor for driving the compression mechanism, and a motor drive circuit for driving the motor is cooled using an intake refrigerant drawn into the compression mechanism. The control unit provides operational control to the motor drive circuit and the refrigeration cycle. The air-conditioning system is characterized in that the control unit varies the rotational speed of the motor via the motor drive circuit to reduce the temperature of the motor drive circuit when the temperature of the motor drive circuit has exceeded a predetermined temperature. The control unit also varies a condition of a supplying air supplied to exchange heat with the refrigerant flowing through the refrigeration cycle to thereby reduce the temperature of the intake refrigerant.

The temperature characteristic of the motor drive circuit versus the rotational speed of the motor exhibits a minimal value at the predetermined rotational speed. This is resulted from the balance between the cooling affect provided by an increase in the quantity of intake refrigerant and the amount of heat generated by the motor drive circuit itself. That is, at relatively low rotational speeds of the motor, the quantity of intake refrigerant increases to provide more enhanced cooling effects as the rotational speed of the motor increases. This in turn causes the temperature of the motor drive circuit to decrease. On the other hand, at relatively high rotational speeds of the motor, an increase in the rotational speed of the motor will cause the amount of heat generated by the motor drive circuit itself to increase and thereby surpass the cooling effect provided by the intake refrigerant. Thus, the temperature of the motor drive circuit rises.

Accordingly, the rotational speed of the motor can be varied (increased or decreased) in response to the rotational speed of the motor, thereby reducing the temperature of the motor drive circuit close to the minimal value.

In addition to this, since the intake refrigerant reduced in temperature enables effective cooling of the motor drive circuit, it is possible to protect the motor drive circuit without stopping the motor.

According to another aspect of the present invention, an air-conditioning system includes a refrigeration cycle and a control unit. The refrigeration cycle includes an electric compressor in which a compression mechanism for drawing a refrigerant therein for compression is integrated with an electric motor for driving the compression mechanism, and a motor drive circuit for driving the motor is cooled using an intake refrigerant drawn into the compression mechanism. The control unit provides operational control to the motor drive circuit and the refrigeration cycle. The air-conditioning system is characterized in that the control unit allows the motor drive circuit to drive the motor when the compression mechanism is at a standstill and the temperature of the motor drive circuit has exceeded a predetermined temperature. The control unit also varies the condition of supplying air to exchange heat with the refrigerant flowing through the refrigeration cycle to thereby reduce the temperature of the intake refrigerant.

Accordingly, even with the refrigeration cycle at a standstill, the refrigerant in the refrigeration cycle is allowed to flow therethrough to reduce the temperature of the intake refrigerant when the temperature of the motor drive circuit has exceeded the predetermined temperature. This makes it possible to effectively cool the motor drive circuit.

According to another aspect of the present invention, the condition of the supplying air is varied in order to increase the amount of cooling air supplied to a condenser for condensing the refrigerant, the condenser being provided in the refrigeration cycle.

This allows the high-pressure-side refrigerant in the refrigeration cycle to be reduced in pressure and temperature, which is followed by a decrease in pressure and temperature of the low-pressure-side refrigerant. It is thus possible to reduce the temperature of the intake refrigerant, which is in turn used to cool the motor drive circuit.

According to another aspect of the invention, the amount of cooling air can be increased by increasing the output of a cooling fan for supplying the cooling air to the condenser.

According to yet another aspect of the present invention, the condition of the supplying air is varied in order to decrease the amount of conditioning air supplied to an evaporator for evaporating the refrigerant, the evaporator being provided in the refrigeration cycle.

This allows the low-pressure-side refrigerant in the refrigeration cycle to be reduced in pressure, which is followed by a decrease in temperature of the low-pressure-side refrigerant. It is thus possible to reduce the temperature of the intake refrigerant, which is in turn used to cool the motor drive circuit.

According to yet another aspect of the present invention, the amount of conditioning air can be decreased by lowering the output of an air blower for supplying the conditioning air to the evaporator.

According to still another aspect of the present invention, the system includes switching means for selecting either air inside or outside the passenger compartment as the conditioning air to be supplied to the evaporator provided in the refrigeration cycle to evaporate the refrigerant. The condition of the supplying air is varied by supplying the conditioning air to the evaporator and by the switching means selecting the lower temperature air of the air inside and the air outside the passenger compartment.

This allows for reducing heat absorbed by the refrigerant in the evaporator to reduce the temperature of the refrigerant. It is thus possible to reduce the temperature of the intake refrigerant, which is in turn used to cool the motor drive circuit.

Alternatively, in another aspect of the present invention, the condition for supplying air may also be varied as follows. That is, the switching means may select the inside air from the air inside and the air outside the passenger compartment while the conditioning air is supplied to the evaporator.

In general, the refrigeration cycle operates to maintain the air inside the passenger compartment at a lower temperature than the outside air. Accordingly, it is possible to eliminate the means for comparing the temperatures of the inside and outside air, so that the lower temperature air may simply be supplied to the evaporator.

According to still another aspect of the present invention, the motor drive circuit is preferably integrated into the electric compressor, thereby providing a compact electric compressor integrated with a motor drive circuit.

Furthermore, according to still another aspect of the present invention, the refrigeration cycle and the control unit can be applied to use with a vehicle. For example, this would make it possible to effectively protect the motor drive circuit even under a harsh outside temperature environment, such as in the engine compartment, in which the motor drive circuit is installed.

Other features and advantages of the present invention will be appreciated, as well as methods of operation and the function of the related parts from a study of the following detailed description, appended claims, and drawings, all of which form a part of this application. In the drawings:

DETAILED DESCRIPTION OF THE PREFERRED EMBODIMENTS

Figure 1:
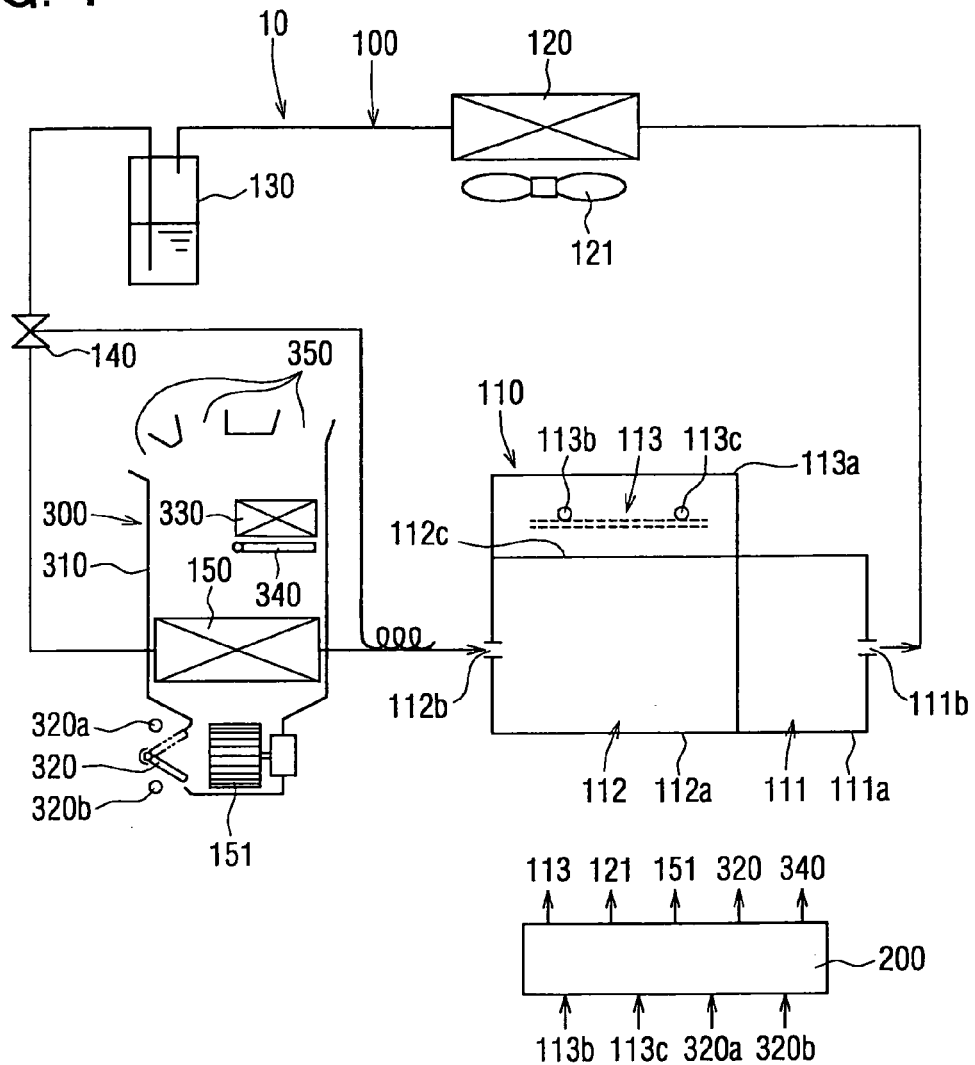
FIG. 1 is a schematic view of an air-conditioning system in accordance with the principles of the present invention.
Figure 2:
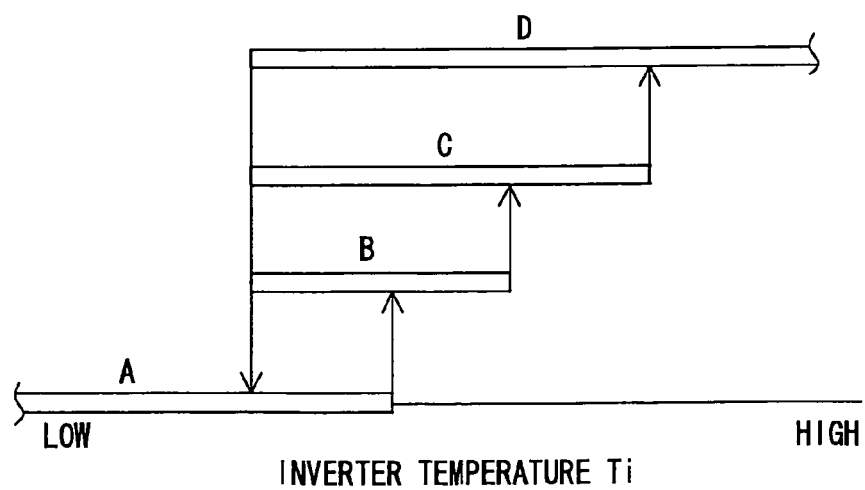
FIG. 2 is a characteristic diagram for a control unit of the air-conditioning system of FIG. 1 illustrating different temperature regions of a motor drive circuit.
Figure 3:
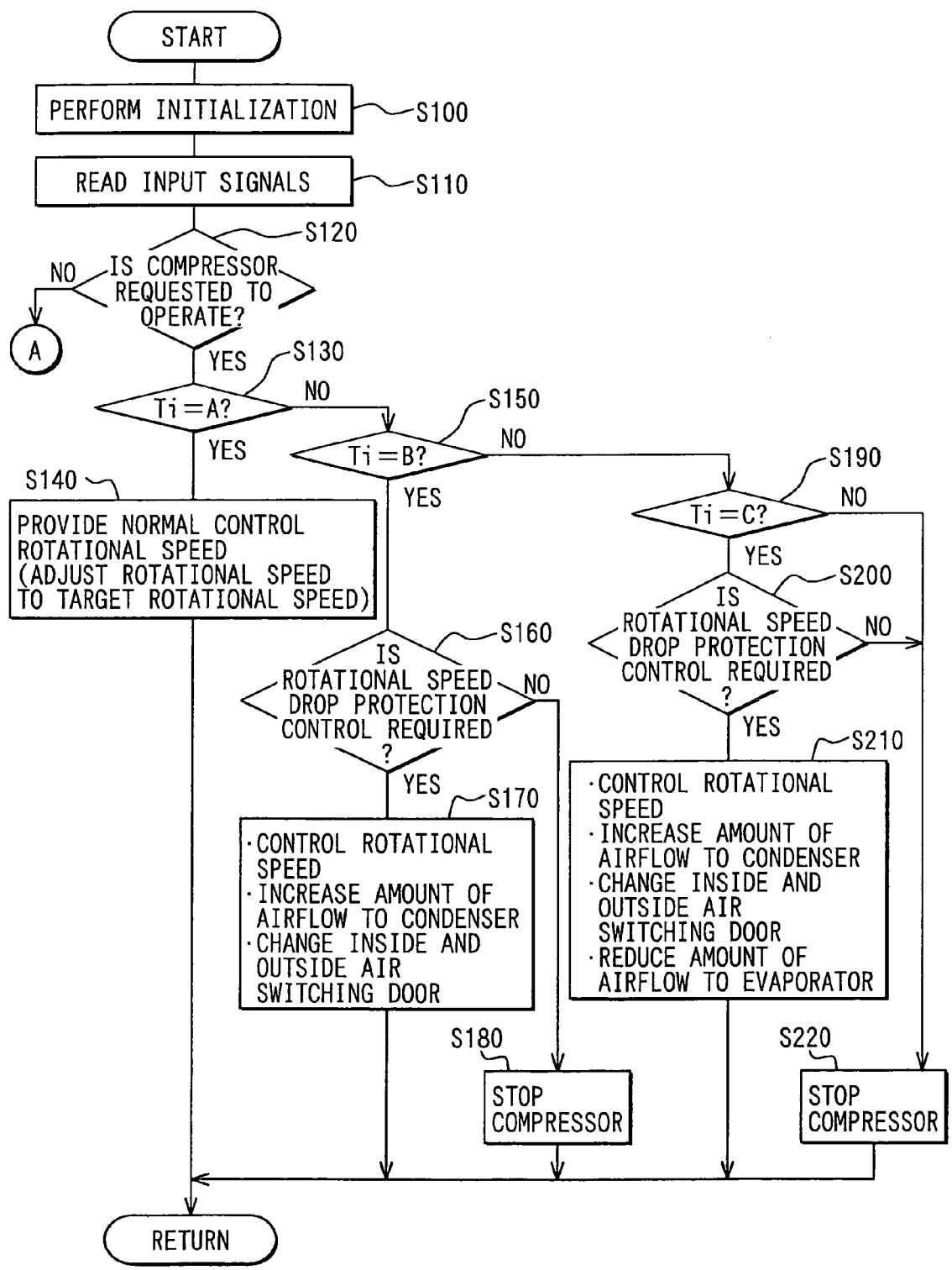
FIG. 3 is a flowchart of a process performed by a control unit of the air-conditioning system of FIG. 1.
Figure 4:
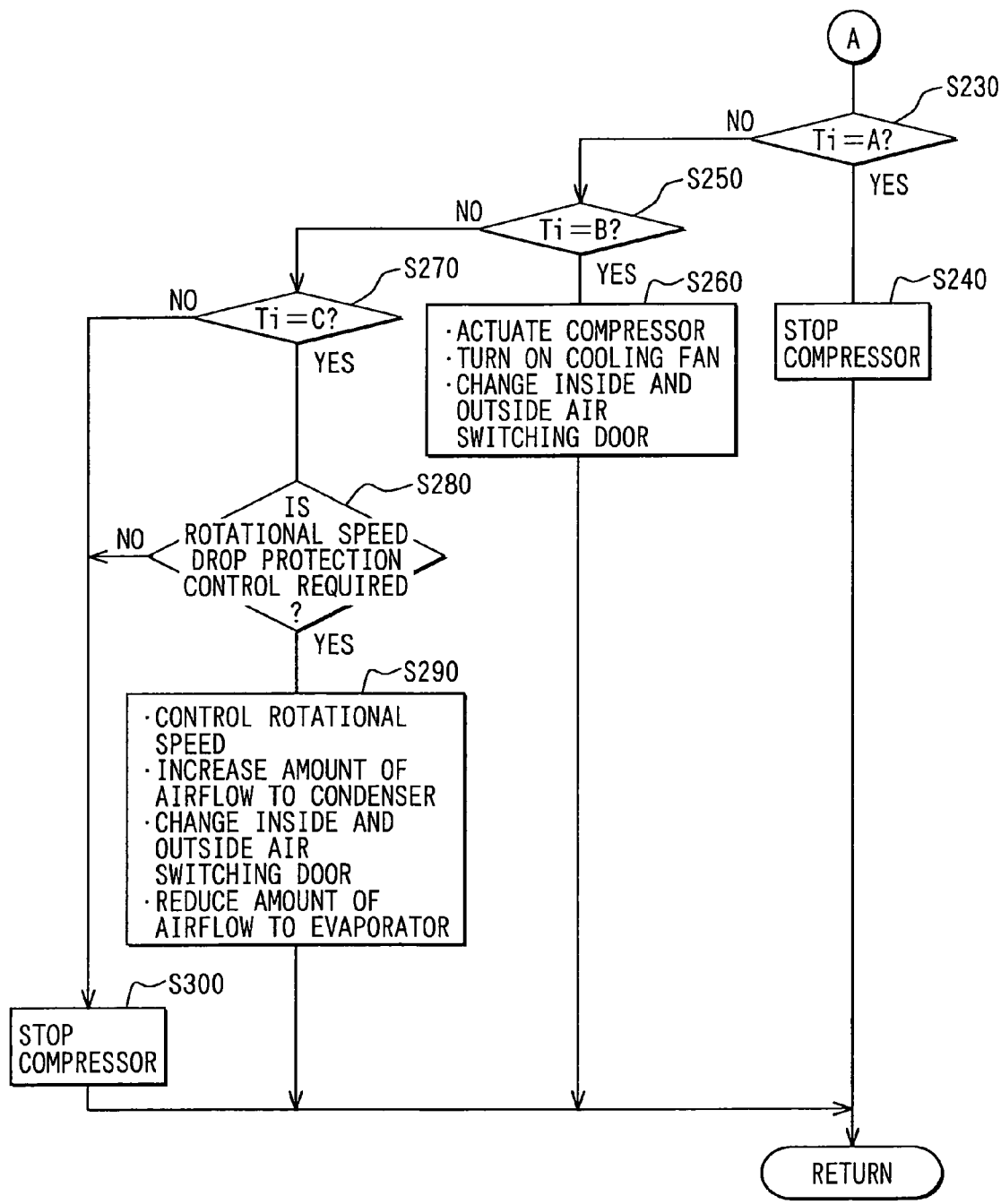
FIG. 4 is a continuation of the flowchart of FIG. 3.

With reference now to FIGS. 1 to 4, a first embodiment of the present invention will be described. FIG. 1 is a schematic diagram illustrating the entire configuration of a vehicular air-conditioning system 10 in which an electric compressor 110 integrated with a motor drive circuit 113 is placed in a refrigeration cycle 100. FIG. 2 shows a characteristic diagram by which a control unit 200 determines the temperature range of the motor drive circuit 113. FIGS. 3 and 4 show a process performed by the control unit 200 to protect the motor drive circuit 113 of the electric compressor 110.

As shown in FIG. 1, the vehicular air-conditioning system according to the present invention (hereinafter referred to as the "air-conditioning system") 10 is intended for use in a hybrid vehicle (also applicable to other fuel-cell electric vehicles and electric vehicles). The air-conditioning system 10 includes the refrigeration cycle 100, an interior unit 300 in which an evaporator 150 of the refrigeration cycle 100 is placed in an air-conditioner casing 310, and the control unit 200 that provides operational control to various devices (detailed later) in the refrigeration cycle 100 and the interior unit 300.

The refrigeration cycle 100 is a well-known cycle in which the electric compressor 110, a condenser 120, a receiver 130, an expansion valve 140, and the evaporator 150 are sequentially coupled to form a closed circuit.

The condenser 120 is a heat exchanger, which cools and condenses a refrigerant discharged from the electric compressor 110 (detailed later). The condenser 120 is provided with a cooling fan 121 for forcefully providing cooling air to effectively cool the refrigerant flowing therethrough. As discussed later, the control unit 200 provides operational control to the cooling fan 121.

The receiver (gas-liquid separator) 130 is a container for separating the refrigerant flowing out of the condenser 120 into a gas phase refrigerant and a liquid phase refrigerant and for allowing the liquid phase refrigerant to flow therefrom, as well as for storing an excessive refrigerant in the refrigeration cycle 100.

The expansion valve 140 is for decompressing the liquid phase refrigerant flowing out of the receiver 130. The evaporator 150 is a heat exchanger for vaporizing the refrigerant decompressed through the expansion valve 140 to cool the conditioning air. In this embodiment, the expansion valve 140 is a temperature-controlled expansion valve, which is designed to adjust the throttle opening so that the superheated refrigerant at the outlet of the evaporator 150 is at a predetermined temperature.

The electric compressor 110, which is provided between the condenser 120 having the cooling fan 121 and the engine (not shown) in the engine compartment of the vehicle, is secured to the engine and subjected to exhaust heat (radiant heat) from an exhaust manifold of the engine.

The electric compressor 110 is integrally equipped with a compression mechanism 111 (of a scroll-type in this embodiment) for drawing a refrigerant therein for compression), an electric motor 112 (a three-phase brush-less DC motor in this embodiment) for driving the compression mechanism 111, and an inverter circuit 113 for driving the electric motor 112.

The compression mechanism 111 and the electric motor 112 are accommodated in a compression mechanism housing 111a and a motor housing 112a, respectively, which are each made of an aluminum alloy. The compression mechanism 111 and the electric motor 112 are coaxially aligned and serially arranged with both the housings 111a and 112a coupled to each other, thus allowing the compression mechanism 111 and the electric motor 112 to be integrated with each other.

The motor housing 112a has a suction inlet 112b connected to the refrigerant outlet of the evaporator 150, while the compression mechanism housing 111a has a discharge outlet 111b connected to the refrigerant inlet of the condenser 120. Thus, the compression mechanism 111 operates to draw the refrigerant from the evaporator 150. This allows the intake refrigerant to pass through the motor housing 112a to the compression mechanism 111. The compression mechanism 111 compresses the refrigerant for discharge to the condenser 120.

The inverter circuit 113 (corresponding to the motor drive circuit of the present invention) is provided in a casing 113a, which is secured to a sidewall 112c (at an upward position in the figure) of the motor housing 112a, thereby allowing the inverter circuit 113 to be integrated with the motor 112.

The inverter circuit 113 includes a switching element, which is controllably turned on or off by the control unit 200, discussed later, via a control circuit (not shown). This on and off operation allows for successively switching motor coils that conduct current, thereby actuating the electric motor 112, as well as varying the rotational speed thereof.

Some of the circuit components (e.g., photo-isolators) that constitute the control circuit within the inverter circuit 113 may be sensitive to heat and the switching element may generate heat due to its power loss. Accordingly, the inverter circuit 113 is placed in close proximity to the sidewall 112c of the motor housing 112a to be cooled by the refrigerant flowing through the motor housing 112a, as described above.

The inverter circuit 113 (particularly, the switching element) is provided with a temperature sensor 113b for detecting a temperature Ti of the inverter circuit 113 and a current sensor 113c for detecting a value of the current flowing through the inverter circuit 113. The sensed signal from each of the sensors 113b and 113c is supplied to the control unit 200, which will be discussed later.

The interior unit 300 is installed under the instrument panel in the passenger compartment of the vehicle and has the plastic air-conditioner casing 310 which accommodates an air blower 151, an inside and outside air switching door 320, a heater 330, and the evaporator 150 mentioned above.

The air blower 151, which is placed upstream of the evaporator 150, takes conditioning air into the air-conditioner casing and to the evaporator 150 and heater 330. As will be discussed later, the control unit 200 provides operational control to the air blower 151.

Further upstream of the air blower 151, the inside and outside air switching door 320 (corresponding to the switching means of the present invention), is provided. The switching door 320 is for selectively taking in either the air inside the passenger compartment (inside air) or the air outside the passenger compartment (outside air). Control is provided by the control unit 200, which will be discussed later, to the pivotal position of the inside and outside air switching door.

In a path of the inside air in fluid communication with the inside and outside air switching door 320, there is placed an inside air temperature sensor 320a for detecting the temperature of the inside air. On the other hand, in a path of the outside air in fluid communication with the inside and outside air switching door 320, there is placed an outside air temperature sensor 320b for detecting the temperature of the outside air. The temperature signal detected by each of the sensors 320a and 320b is supplied to the control unit 200, as will be discussed later.

Downstream of the evaporator 150, the heater 330, which employs the water heated by the engine as a heat source to heat the conditioning air, is provided. Between the evaporator 150 and the heater 330, there is provided an air mix door 340 for adjusting the mixture ratio between the air cooled by the evaporator 150 and the air heated by the heater 330. As discussed later, the control unit 200 provides operational control to the air mix door 340.

Downstream of the heater 330 of the air-conditioner casing 310, a plurality of blow-off outlets 350, which are connected to predetermined portions in the passenger compartment, are provided.

The control unit 200 provides operational control to the inverter circuit 113 (i.e., the electric motor 112 and the compression mechanism 111), the cooling fan 121, the air blower 151, the inside and outside air switching door 320, and the air mix door 340. The control is based on each of the sensed signals from the temperature sensor 113b, the current sensor 113c, the inside air temperature sensor 320a, the outside air temperature sensor 320b, the air-conditioning request signal (not shown) provided by a user, a temperature setting signal (not shown) or the like.

Additionally, as shown in FIG. 2, the control unit 200 has a characteristic diagram pre-stored therein, which defines a plurality of separate operational temperature regions of the inverter circuit 113 (each region labeled with respective letters "A", "B", "C", and "D" in the order of increasing temperature). Depending on the temperature region (the predetermined temperatures of the present invention corresponding to "B", "C", and "D") corresponding to the temperature detected, operational control is provided to the cooling fan 121, the air blower 151, and the inside and outside air switching door 320, as will be discussed in more detail later.

Now, an explanation will be given as to how the air-conditioning system 10 operates with the aforementioned configuration. First, as the basic control, upon reception of the air-conditioning request signal from a user, the control unit 200 uses the temperature setting signal, and the temperature signals from the inside and outside air temperature sensors 320a and 320b to compute the required air blow temperature based on a predetermined arithmetic equation. Depending on the required air blow temperature calculated, the control unit 200 adjusts the rotational speed of the motor 112 via the inverter circuit 113, thereby allowing the compression mechanism 111 to operate at a target rotational speed. At the same time, the control unit 200 allows the cooling fan 121 and the air blower 151 to operate at the target rotational speed, so that the pivotal positions of the inside and outside air switching door 320 and the air mix door 340 are changed to the target positions.

Conditioning air is drawn into the air blower 151 through the open side of the inside and outside air switching door 320, diverted to the evaporator 150, and cooled by the refrigerant passing through the evaporator 150. The air mix door 340 adjusts the mixture ratio between this cooled air and the air partially heated by the heater 330 to provide the conditioning air controlled in temperature to the setting temperature. The resulting conditioning air is then allowed out of the blow-off outlets 350.

In this arrangement, the inverter circuit 113 is cooled by the intake refrigerant, which flows through the motor housing 112a. However, depending on the operational condition of the inverter circuit 113 or the condition of the radiant heat from the engine, the intake refrigerant alone may not be sufficient to cool the inverter circuit 113. In this context, the present invention provides control to address such an insufficient cooling capability. This will now be explained below using the flowcharts shown in FIGS. 3 and 4.

First, as shown in FIG. 3, the control unit 200 performs each initialization and initial setting operations (step S100) to read the aforementioned various input signals (step S110). Suppose the process determines in step S120 that the compression mechanism 111 is requested to operate (i.e., the air-conditioning request signal is issued or the compression mechanism 111 needs to operate in response to the required air blow temperature). In this case, the process determines in step S130 whether the temperature Ti of the inverter circuit 113 obtained from the temperature sensor 113b is within region "A" of the characteristic diagram. If the process determines that the temperature Ti of the inverter circuit 113 is within the lowest region "A," then the process allows the compression mechanism 111 to operate at the target rotational speed in step S140. This procedure corresponds to the aforementioned normal control operation.

On the other hand, if NO in step S130, then the process determines in step S150 whether the temperature Ti of the inverter circuit 113 is within region "B," which is higher than region "A" by one rank. If the temperature Ti is determined to stay in region "B," the process determines in step S160 whether a rotational speed drop protection is required. As used herein, the rotational speed drop protection is intended to forcefully stop the compression mechanism 111 to protect the inverter circuit 113 when the motor supply current from the inverter circuit 113 likely exceeds the allowable current limit (step S180). If the rotational speed drop protection is determined not to be required, then in step S170, the process varies (increases or decreases) the rotational speed of the motor 112, as well as actively reduces the temperature of the intake refrigerant, thereby providing an enhanced cooling effect to the inverter circuit 113.

The temperature characteristic of the inverter circuit 113 versus the rotational speed of the motor 112 exhibits a minimal value at the predetermined rotational speed. This is resulted from the balance between the cooling effect provided by an increase in the quantity of intake refrigerant and the amount of heat generated by the inverter circuit 113 itself. That is, at relatively low rotational speeds of the motor 112 (lower than the predetermined rotational speed), the quantity of intake refrigerant is increased to provide more enhanced cooling effects as the rotational speed of the motor 112 increases. This in turn causes the temperature of the inverter circuit 113 to decrease. On the other hand, at relatively high rotational speeds of the motor 112 (higher than the predetermined rotational speed), an increase in the rotational speed of the motor 112 will lead to an increase in the amount of heat generated by the inverter circuit 113 itself to surpass the cooling effect provided by the intake refrigerant. This causes an increase in the temperature Ti of the inverter circuit 113.

Accordingly, in step S170, when the rotational speed of the motor 112 is lower than the predetermined rotational speed, the process first increases the rotational speed via the inverter circuit 113. On the contrary, at a rotational speed higher than the predetermined rotational speed, the process reduces the rotational speed. Then, the process increases the rotational speed of the cooling fan 121 in the condenser 120 (or increases the output of the cooling fan 121) to provide an increased amount of cooling air. Furthermore, the pivotal position of the inside and outside air switching door 320 is changed so that the inside or outside air, whichever is lower in temperature, is selected based on the air temperature provided by the inside and outside air temperature sensors 320a and 320b, thereby allowing the lower temperature air to be supplied to the evaporator 150.

Then, the change (increase or decrease) in the rotational speed of the motor 112 causes the temperature Ti of the inverter circuit 113 to reduce close to the minimal value. In addition to this, the amount of cooling air from the cooling fan 121 increases to thereby reduce the pressure and temperature of the high-pressure-side refrigerant of the refrigeration cycle 100, which is followed by an increase in pressure and temperature of the low-pressure-side refrigerant. Furthermore, the low temperature air supplied to the evaporator 150 reduces the amount of heat to be absorbed by the refrigerant, thus causing the refrigerant to drop in temperature. In this manner, the drop in temperature of the amount of the intake refrigerant introduced into the motor housing 112a allows for effectively cooling the inverter circuit 113.

If NO in step S150, the process further determines in step S190 whether the temperature Ti of the inverter circuit 113 is within region "C," which is higher by one rank than region "B." If the temperature Ti is determined to be within region "C," then like in step S160, the process determines in step S200 whether the rotational speed drop protection is required. If the rotational speed drop protection is determined not to be required, then in step S210, the process further reduces the temperature of the intake refrigerant as compared to the step S170 to provide an enhanced cooling effect to the inverter circuit 113.

That is, in step S170, the motor 112 is changed in rotational speed, the cooling fan 121 of the condenser 120 is increased in rotational speed, and the inside and outside air switching door 320 is changed in pivotal position. In addition to these operations, in step S210, the process reduces the rotational speed of the air blower 151 (or the output of the air blower 151) to decrease the amount of air blown (the amount of conditioning air).

Then, the decrease in the amount of air blown from the air blower 151 causes the low-pressure-side refrigerant in the refrigeration cycle 100 to reduce in pressure, which is followed by a drop in temperature of the low-pressure-side refrigerant. This in turn causes the intake refrigerant introduced into the motor housing 112a to be further reduced in temperature as compared to step S170 and, thus, the inverter circuit 113 to be effectively cooled.

If NO in step S190, the temperature Ti of the inverter circuit 113 is within region "D," which is the highest in the characteristic diagram. If NO in step S200, the rotational speed drop protection is required and, thus, the compression mechanism 111 is forcefully stopped in step S220.

On the other hand, in step S120, if it is determined that there is no request for the compression mechanism 111 to operate, the process proceeds to step S230 as shown in FIG. 4. In the steps subsequent to step S230, the flowchart is provided to prevent the risk of the inverter circuit 113 being damaged due to an increase in temperature Ti thereof. For example, this increase in temperature Ti may result from the heat radiated by the engine in the engine compartment even when the compression mechanism 111 is at a standstill (i.e., the refrigeration cycle 100 is at a standstill).

That is, the process determines in step S230 whether the temperature Ti of the inverter circuit 113 is within region "A." If the temperature Ti is determined to be within region "A," then among other things, the inverter circuit 113 needs not to be cooled and, thus, the compression mechanism 111 is brought to a standstill (step S240).

If NO in step S230, the process determines in step S250 whether the temperature Ti of the inverter circuit 113 is within region "B." If the temperature Ti is determined to be within region "B," then the process cools the inverter circuit 113 in step S260. That is, in step S260, the process allows the inverter circuit 113 to actuate the motor 112, the compression mechanism 111, and the cooling fan 121, as well as to change the pivotal position of the inside and outside air switching door 320 to draw the lower temperature inside or outside air.

Then, the compression mechanism 111 operates to allow the refrigerant to circulate through the refrigeration cycle 100 allowing the inverter circuit 113 to be cooled by the intake refrigerant. In addition to this, the actuation of the cooling fan 121 causes the high-pressure-side refrigerant to be reduced in pressure and temperature, which is followed by the low-pressure-side refrigerant to be reduced in pressure and temperature. Furthermore, the lower temperature air being supplied to the evaporator 150 will reduce the temperature of the low-pressure-side refrigerant, allowing the intake refrigerant reduced in temperature to effectively cool the inverter circuit 113.

If NO in step S250, then in step S270, the process determines whether the temperature Ti of the inverter circuit 113 is within region "C." If the temperature Ti is determined to be within region "C," the process determines in step S280 whether the rotational speed drop protection is required. If the rotational speed drop protection is not required, then in step S290, the process further reduces the temperature of the intake refrigerant as compared to step S260.

That is, like in steps S170 and S210 described above, the process changes the rotational speed of the motor 112 in step S290. Then, the rotational speed of the cooling fan 121 is increased to provide an increased amount of cooling air, while the pivotal position of the inside and outside air switching door 320 is selected to draw the lower temperature air of the inside and outside air. Additionally, the air blower 151 is reduced in rotational speed to decrease the amount of air blow to be supplied to the evaporator 150.

Then, the change in rotational speed of the motor 112 causes the temperature Ti of the inverter circuit 113 to be reduced close to the minimal value. The increase in the amount of cooling air provided by the cooling fan 121 causes the low-pressure-side refrigerant to be reduced in temperature, allowing the lower temperature air to be supplied to the evaporator 150 and the low-pressure-side refrigerant to be thereby reduced in temperature. Furthermore, the decrease in the amount of air blown from the air blower 151 causes the low-pressure-side refrigerant to be reduced in temperature. This in turn causes the temperature of the intake refrigerant introduced into the motor housing 112a to be further reduced as compared to step S260, thereby allowing the inverter circuit 113 to be effectively cooled.

If NO in step S270 (i.e., the temperature Ti of the inverter circuit 113 is within region "D") and if NO in step S280 (i.e., the rotational speed drop protection is required), the process stops the compression mechanism 111 in step S300.

According to the control flow, the process is adapted to stop the compression mechanism 111 in steps S220 and S300. However, in practice, the region "C," which is used for determinations in steps S190 and S270, is provided in agreement with the upper limit temperature to which the inverter circuit 113 can reach. This is intended to avoid stopping the compression mechanism 111 such that the compression mechanism 111 can be stopped to provide safety control in the event of an accident.

This makes it possible to vary (i.e., increase or decrease) the rotational speed of the motor 112 to reduce the temperature Ti of the inverter circuit 113 depending on the rotational speed of the motor 112. Additionally, the condition for the supplying air supplied to exchange heat with the refrigerant flowing through the refrigeration cycle 100 can be varied (i.e., the amount of cooling air from the cooling fan 121 is increased, the amount of air blown from the air blower 151 is reduced, or the lower temperature air is drawn into the evaporator 150). This makes it possible to effectively reduce the temperature of the low-pressure-side refrigerant and, thus, effectively cool the inverter circuit 113 by the intake refrigerant reduced in temperature, thereby protecting the inverter circuit 113 without stopping the motor 112.

Furthermore, even with the compression mechanism 111 at a standstill (i.e., while the refrigeration cycle 100 is at a standstill), the motor 112 operates depending on the temperature Ti of the inverter circuit 113 allowing the refrigerant in the refrigeration cycle 100 to flow therethrough and reduce the temperature of the lower-temperature-side refrigerant. This enables the inverter circuit 113 to be effectively protected.

In the aforementioned first embodiment, the pivotal position of the inside and outside air switching door 320 is determined by the inside and outside air temperatures being compared with each other to introduce the lower temperature conditioning air; however, the present invention is not limited thereto. IN an alternative method, the inside and outside air temperature sensors 320a and 320b may be eliminated to control the pivotal position of the inside and outside air switching door 320 so as to draw only the inside air.

This is because the inverter circuit 113, among other things, needs to be cooled when the outside air is at a high temperature and the air-conditioning system 10 is required to provide a high cooling output. In this case, the refrigeration cycle 100 operates to maintain the inside air at a lower temperature than the outside air.

In the aforementioned embodiments, the following three operations were performed in combination (or at the same time) in order to reduce the temperature of the low-pressure-side refrigerant in the refrigeration cycle 100 (steps S170, S210, S260, and S290). That is, the amount of cooling air from the cooling fan 121 was increased, the amount of air blown from the air blower 151 was reduced, and the lower temperature air was drawn into the evaporator 150 in combination or at the same time; however, the invention is not limited thereto. These operations may alternatively be performed separately depending on the increase in temperature of the inverter circuit 113.

For example, these operations may be combined in such a manner that only the amount of cooling air from the cooling fan 121 is increased in step S170, while only the amount of air blown from the air blower 151 is reduced in step S210.

Furthermore, the amount of cooling air provided to the condenser 120 and the amount of air blown to the evaporator 150 may not be varied by varying the output (or the rotational speed) of the cooling fan 121 and the air blower 151, respectively. Alternatively, doors (such as a pivotal door or sliding door) or shutters (such as a pivotal shutter or curtain shutter) as provided in the air passageways to the condenser 120 or the evaporator 150 may also be employed for these purposes.

Furthermore, in the aforementioned embodiments, the inverter circuit 113 was integrated with the motor 112 as described above. However, the present invention is not limited thereto but the inverter circuit 113 may also be separate from the compression mechanism 111 or the motor 112.

Still further, the air-conditioning system 10 is applicable to use not only with vehicles but also with a refrigerator for household air conditioners or kitchen appliances.

Furthermore, the compression mechanism 111 was illustrated as being of a scroll type; however, compression mechanisms of any other types such as those of rotary or vane types may also be employed. The motor 112 is not limited to the three phase brush-less DC motor disclosed herein, but may also include other alternating-current motors.

In the aforementioned embodiments, the invention is applied to a general electric compressor 110; however, the invention is not limited thereto. Alternatively, the invention may also be applicable to a hybrid-type compressor, which is capable of switching between the cases where the compression mechanism 111 is driven by a drive source other than the motor 112 via a power transmission such as a belt and where the motor 112 drives the compression mechanism 111.

What is claimed is:

1. An air-conditioning system comprising:
a refrigeration cycle including an electric compressor, in which a compression mechanism for drawing a refrigerant therein for compression, is integrated with an electric motor for driving the compression mechanism, and a motor drive circuit for driving the electric motor is cooled using an intake refrigerant drawn into the compression mechanism; and
a control unit for providing operational control to the motor drive circuit and the refrigeration cycle, wherein
when the compression mechanism is at a standstill and a temperature of the motor drive circuit has exceeded a predetermined temperature, the control unit allows the motor drive circuit to drive the electric motor, and the control unit varies a condition of supplying air to exchange heat with the refrigerant flowing through the refrigeration cycle to thereby reduce the temperature of the intake refrigerant and simultaneously operates the electric motor via the motor drive circuit to reduce the temperature of the motor drive circuit even in a state where the compression mechanism is not requested to operate.

2. The air-conditioning system according to claim 1, wherein
the condition of the supplying air is varied in order to increase an amount of cooling air supplied to a condenser for condensing the refrigerant, the condenser being provided in the refrigeration cycle.

3. The air-conditioning system according to claim 2, wherein
the amount of cooling air can be increased by increasing an output of a cooling fan for supplying the cooling air to the condenser.

4. The air-conditioning system according to claim 1, wherein
the condition of the supplying air is varied in order to decrease an amount of conditioning air supplied to an evaporator for evaporating the refrigerant, the evaporator being provided in the refrigeration cycle.

5. The air-conditioning system according to claim 4, further comprising an air blower for supplying the conditioning air to the evaporator, wherein
the amount of conditioning air is decreased by lowering the output of the air blower.

6. The air-conditioning system according to claim 1, further comprising switching means for selecting one of inside air and outside air relative to a passenger compartment to be the conditioning air to be supplied to the evaporator provided in the refrigeration cycle to evaporate the refrigerant, wherein
the condition of the supplying air is varied by supplying the conditioning air to the evaporator and by the switching means selecting the lower temperature air from the inside air and the outside air.

7. The air-conditioning system according to claim 1, further comprising switching means for selecting one of inside air and outside air relative to a passenger compartment to be the conditioning air to be supplied to the evaporator provided in the refrigeration cycle to evaporate the refrigerant, wherein
the condition for supplying air is varied by the switching means selecting one of the inside air and outside air while the conditioning air is supplied to the evaporator.

8. The air-conditioning system according to claim 1, wherein
the motor drive circuit is integrated into the electric compressor.

9. The air-conditioning system according to claim 1, wherein
the refrigeration cycle and the control unit are applied to use with a vehicle.

10. The air-conditioning system according to claim 1, wherein
the control unit varies the rotational speed of the motor via the motor drive circuit to reduce the temperature of the motor drive circuit.

11. The air-conditioning system according to claim 1, wherein the motor drive circuit is located in a position which receives heat radiated from an engine in an engine compartment.

12. The air-conditioning system according to claim 1, wherein the temperature of the motor drive circuit is detected when the compression mechanism is not requested to operate.

13. The air-conditioning system according to claim 1, wherein the control unit starts the compressor by driving the electric motor when the temperature of the motor drive circuit exceeds the predetermined temperature.

14. An air-conditioning system comprising:
a refrigeration cycle including an electric compressor, in which a compression mechanism for drawing a refrigerant therein for compression, is integrated with an electric motor for driving the compression mechanism, and a motor drive circuit for driving the electric motor is cooled using an intake refrigerant drawn into the compression mechanism; and
a control unit for providing operational control to the motor drive circuit and the refrigeration cycle, wherein
when the compression mechanism is not requested to operate and a temperature of the motor drive circuit has exceeded a predetermined temperature, the control unit controls the motor drive circuit to drive the electric motor, and the control unit varies a condition of supplying air to exchange heat with the refrigerant flowing through the refrigeration cycle to thereby reduce the temperature of the intake refrigerant and simultaneously operates the electric motor via the motor drive circuit to reduce the temperature of the motor drive circuit.

15. The air-conditioning system according to claim 14, wherein
the condition of the supplying air is varied in order to increase an amount of cooling air supplied to a condenser for condensing the refrigerant, the condenser being provided in the refrigeration cycle.

16. The air-conditioning system according to claim 15, further comprising switching means for selecting one of inside air and outside air relative to a passenger compartment to be the conditioning air to be supplied to the evaporator provided in the refrigeration cycle to evaporate the refrigerant, wherein
the condition of the supplying air is varied by supplying the conditioning air to the evaporator and by the switching means selecting the lower temperature air from the inside air and the outside air.

17. The air-conditioning system according to claim 16, wherein
the condition of the supplying air is varied in order to decrease an amount of conditioning air supplied to an evaporator for evaporating the refrigerant, the evaporator being provided in the refrigeration cycle.

18. The air-conditioning system according to claim 17, wherein
the control unit varies the rotational speed of the motor via the motor drive circuit to reduce the temperature of the motor drive circuit.

19. The air-conditioning system according to claim 14, further comprising switching means for selecting one of inside air and outside air relative to a passenger compartment to be the conditioning air to be supplied to the evaporator provided in the refrigeration cycle to evaporate the refrigerant, wherein
the condition of the supplying air is varied by supplying the conditioning air to the evaporator and by the switching means selecting the lower temperature air from the inside air and the outside air.

20. The air-conditioning system according to claim 14, wherein
the condition of the supplying air is varied in order to decrease an amount of conditioning air supplied to an evaporator for evaporating the refrigerant, the evaporator being provided in the refrigeration cycle.

21. The air-conditioning system according to claim 14, wherein
the control unit varies the rotational speed of the motor via the motor drive circuit to reduce the temperature of the motor drive circuit.

22. The air-conditioning system according to claim 21, wherein
the condition of the supplying air is varied in order to decrease an amount of conditioning air supplied to an evaporator for evaporating the refrigerant, the evaporator being provided in the refrigeration cycle.

23. The air-conditioning system according to claim 22, wherein
the condition of the supplying air is varied in order to increase an amount of cooling air supplied to a condenser for condensing the refrigerant, the condenser being provided in the refrigeration cycle.

24. The air-conditioning system according to claim 14, wherein the motor drive circuit is located in a position which receives heat radiated from an engine in an engine compartment.

25. The air-conditioning system according to claim 14, wherein the temperature of the motor drive circuit is detected when the compression mechanism is not requested to operate.

26. The air-conditioning system according to claim 14, wherein the control unit starts the compressor by driving the electric motor when the temperature of the motor drive circuit exceeds the predetermined temperature.

* * * * *